United States Patent [19]
Renzi

[11] Patent Number: 5,117,758
[45] Date of Patent: Jun. 2, 1992

[54] BOOSTER ROCKET RANGE SAFETY SYSTEM

[75] Inventor: John R. Renzi, Ellicott City, Md.

[73] Assignee: The United States of America as represented by the Secretary of the Navy, Washington, D.C.

[21] Appl. No.: 765,618

[22] Filed: Sep. 25, 1991

[51] Int. Cl.[5] .............................................. F42B 15/38
[52] U.S. Cl. ..................................... 102/378; 89/1.14; 244/172
[58] Field of Search ........................... 244/172, 158 R; 102/378, 377, 701; 89/1.14

[56] References Cited

U.S. PATENT DOCUMENTS

| | | | |
|---|---|---|---|
| 3,048,107 | 8/1962 | Samms | 102/378 |
| 3,218,973 | 11/1965 | Hallum | 102/378 |
| 3,244,104 | 4/1966 | Mills et al. | 102/378 |
| 3,903,803 | 9/1975 | Losey | 102/378 |
| 4,452,412 | 6/1984 | von Pragenau | 244/172 |
| 4,649,824 | 3/1987 | Guay | 89/1.14 |
| 4,685,376 | 8/1987 | Noel et al. | 102/378 |

Primary Examiner—David H. Brown
Attorney, Agent, or Firm—Kenneth E. Walden; Jacob Shuster

[57] ABSTRACT

In response to an abort command, fragmentation of a propellant booster rocket carried on a missile is limited by positioning of annular shaped charges at axially spaced locations on the outer shell of the booster rocket. Detonation of the charges thereby severs an intermediate section of the rocket from forward and aft sections which remain attached to the missile. The intermediate section is separated from the missile by such severing action to prevent further fragmenting forces from being imparted thereto.

7 Claims, 4 Drawing Sheets

BOOSTER ROCKET RANGE SAFETY SYSTEM

BACKGROUND OF THE INVENTION

This invention relates generally to the flight termination of booster rockets, in response to a range safety destruct command, from air launched vehicles or the like by detonation of shaped charges.

Booster rockets carried on the external tank of a Space Shuttle vehicle, for example, have heretofore been destructed on range safety command during a launch by detonation of linear shaped charges mounted on and extending longitudinally along the outer shells of the booster rockets. An example of such an explosive destruct system for booster rockets is disclosed in U S. Pat. No. 4,649,824 to Guay.

Explosive destruct of booster rockets has heretofore been accompanied by massive and potentially dangerous fragmentation. It was discovered that one possible cause for such fragmentation results from longitudinal splitting of the booster rocket shell attached to the external tank by detonation of the linear charge causing "bend buckling" or axial bending of the shell during the destruct or "break up" process. Such bending of the shell would account for fragmentation instability and scattering of high velocity fragments with potentially damaging results.

It is therefore an important object of the present invention to substantially reduce the degree of fragmentation of booster shells and fragment velocities heretofore accompanying a destruct sequence initiated on abort command during launch of aerospace vehicles or the like.

SUMMARY OF THE INVENTION

In accordance with one embodiment of the present invention, the rocket propelling boosters on the external tank of an aerospace vehicle are pivotally connected thereto at locations close to the forward and aft ends of the rocket shell so that attachment is limited to the forward and aft section of the booster from which an intermediate shell section is separated during the destruct sequence. The forward, aft and intermediate sections of each rocket booster are severed from each other by jet cutting actions in response to detonation of explosive charges focused by their annular or ring shape. Such ring shaped charges are restrictively positioned at predetermined locations by their mounting means in encircling relation to on and encircle each booster shell at axial locations thereon in spaced adjacency to the attachment locations. The severed intermediate shell section is not only separated thereby from the aerospace vehicle but is isolated from any rocket propelling thrust capable of exerting axial bending forces thereon.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENT

Figure 1:
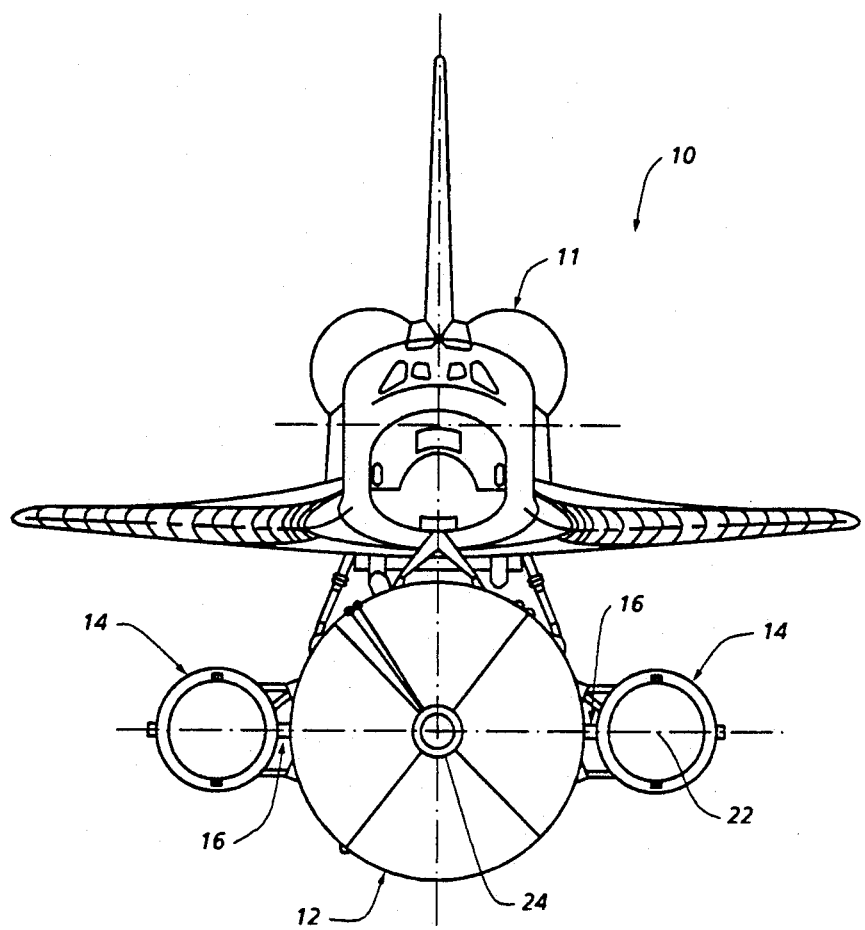
FIG. 1 is a front elevation view of an aerospace shuttle with which the present invention is associated in accordance with one exemplary embodiment.
Figure 2:
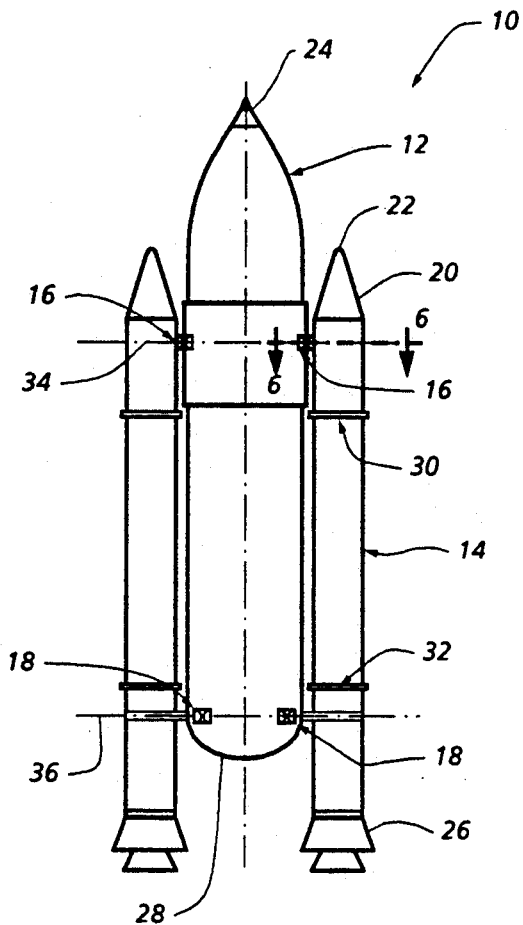
FIG. 2 is a somewhat simplified bottom plan view of the external tank associated with the aerospace shuttle shown in FIG. 1.

Referring now to the drawing in detail, FIGS. 1 and 2 illustrate by way of example an aerospace shuttle, generally referred to by reference numeral 10, having an external tank 12 adapted to carry a space vehicle 11 and a pair of solid fuel booster rockets 14. The foregoing components of shuttle 10 are generally known in the art, including attachment assemblies 16 and 18 through which the rocket boosters 14 are attached to opposite sides of the cylindrical tank 12 in 180° angular relation to each other. Each rocket booster 14 as shown in FIG. 2 has a forward section 20 extending forwardly from attachment 16 to a forward nose cone tip 22 which is spaced rearwardly from the nose cone tip 24 of tank 12. The aft exhaust end section 26 of the rocket booster 14 projects rearwardly from attachment 18 beyond the tail end 28 of tank 12.

Figure 3:
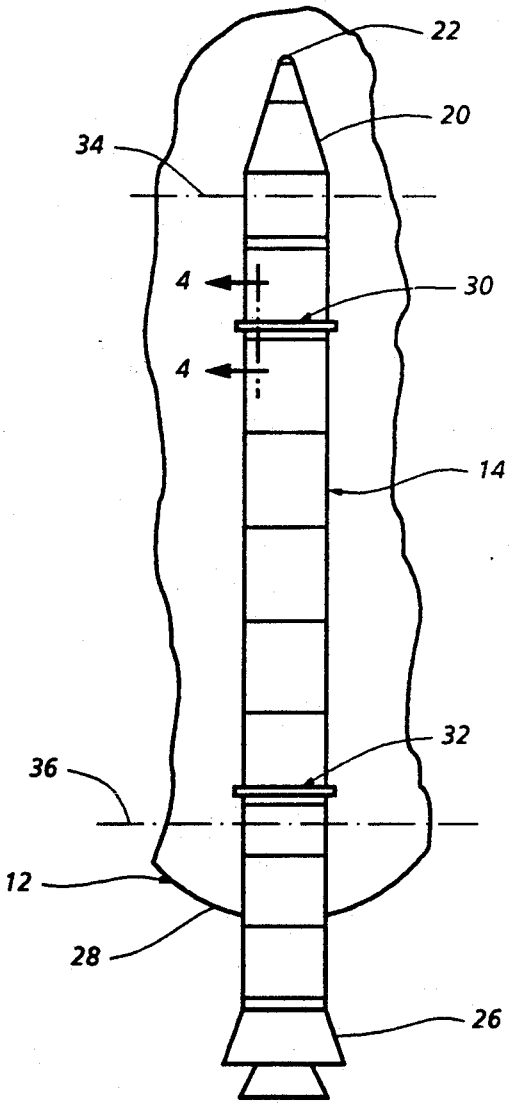
FIG. 3 is an enlarged partial side elevation view of the external tank attached booster rocket.

In accordance with the present invention, each rocket booster 14 externally mounts thereon a pair of annular or ring-shaped explosive charges 30 and 32. The forward section 20 of each rocket booster extends forwardly of the upper charge 30 while the aft section 26 extends rearwardly from the lower charge 32 as shown in FIGS. 2 and 3. Further, the upper attachment 16 is located on the forward section 20 axially between the nose tip 22 and the charge 30 while the lower attachment 18 is located on the aft section 26 spaced axially rearwardly from the charge 32. Attachment of each rocket booster 14 to the tank 12 is limited exclusively to the axially spaced locations 34 and 36 thereon as denoted in FIGS. 2 and 3.

Figure 4:
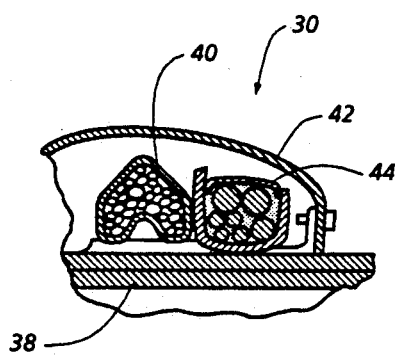
FIG. 4 is an enlarged partial section view taken substantially through a plane indicated by section line 4—4 in FIG. 3.

As more clearly seen in FIG. 4, each annular charge 30 or 32 encircles the outer cylindrical shell 38 of the rocket booster by substantially 360° and includes therein a continuous tubular explosive ring 40, which may be constructed in a segmented fashion. The explosive rings 40 as shown are retained on the shell 38 at predetermined locations adjacent to the attachment locations 34 and 36 by mounting means which includes a tunnel cover 42 adapted to be attached to the outer shell 38 in enclosing relation to each ring 40. Also enclosed within cover 42 is electrical cabling and confined detonating fuze 44 through which the charge is detonated. The confined detonating fuze extends to the charges 30 and 32 as diagramed in FIG. 9.

Figure 5:
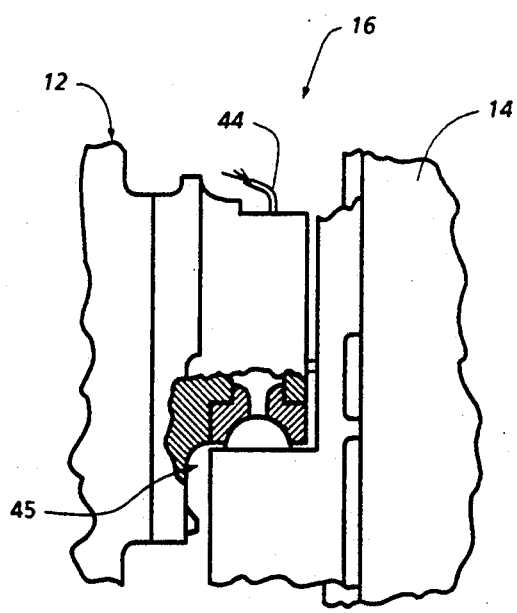
FIG. 5 is an enlarged partial detailed view of the forward attachment between the external tank and one of the booster rockets.
Figure 6:
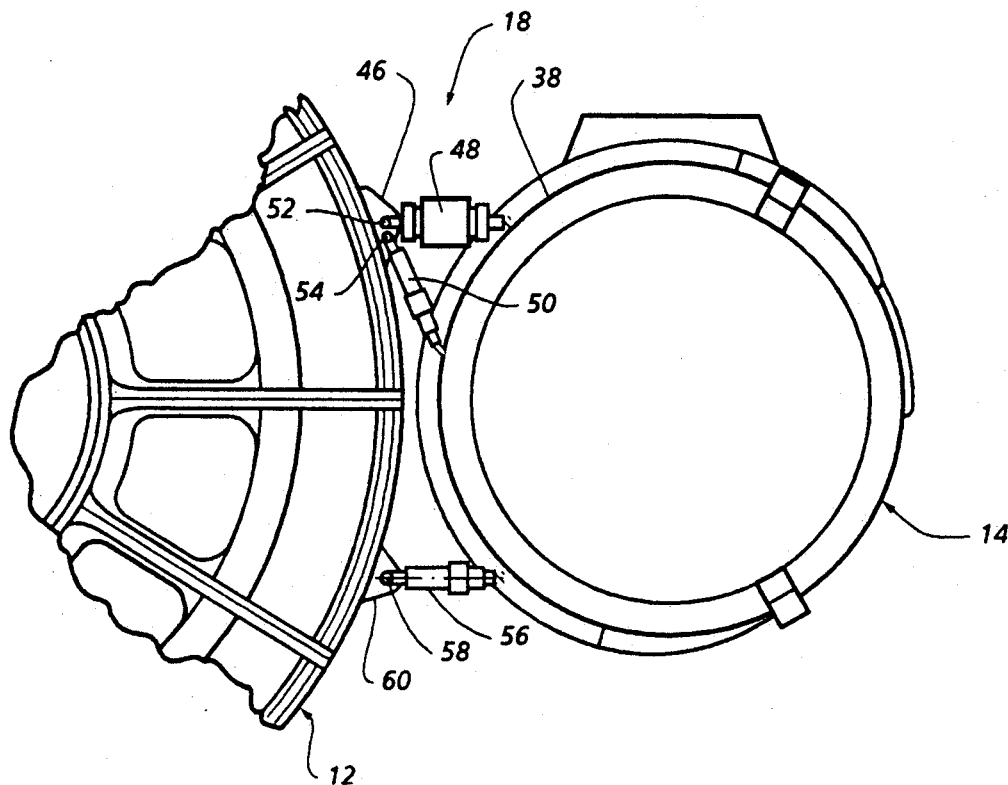
FIG. 6 is an enlarged partial section view taken substantially through a plane indicated by section line 6—6 in FIG. 2.

As more clearly seen in FIG. 5, each attachment 16 has a ball bearing type pivot connection 45 between the external tank 12 and booster rocket 14. Each attachment 18 on the other hand, has an upper pivotal bracket 46 through which connectors 48 and 50 interconnect the outer shell 38 of a rocket booster 14 with the tank 12 at closely spaced pivot points 52 and 54 as shown in FIG. 6. A third connector 56 of each attachment 18 interconnects the booster 14 with tank 12 at a third pivot point 58 through another bracket 60. The details of such attachments 16 and 18 are illustrated herein by way of example only and form no part of the present invention.

Figure 7:
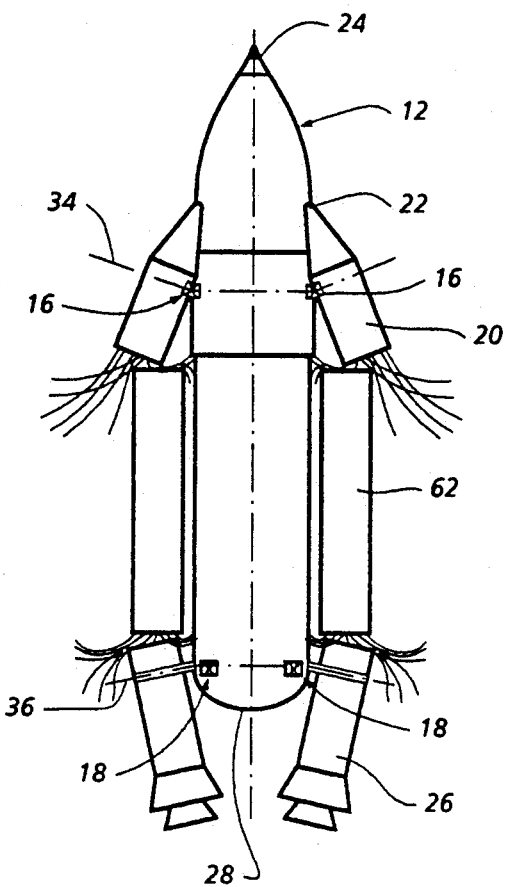
FIG. 7 is a front elevation view of the assembly shown in FIG. 2 shortly after generation of a booster range safety command during a launch aborting destruct sequence.

In accordance with the present invention, the charges 30 and 32 are detonated during a destruct sequence to sever the forward and aft sections 20 and 26 of each booster rocket 14 from a relatively large intermediate section 62 as shown in FIG. 7. Accordingly, each intermediate section 62 is then unable to generate its own thrust so that its residual velocity upon separation is essentially the velocity of the booster 14 before the destruct action. The forward and aft sections 20 and 26 of each booster rocket on the other hand remain attached to the tank 12 as shown in FIG. 6 and are unable to impart any axial bending forces to the separated intermediate section 62. Thus, the three severed and separated sections 20, 26, and 62 of each booster 14 are relatively benign fragments in terms of rocket booster debris after the destruct action.

Figure 8:
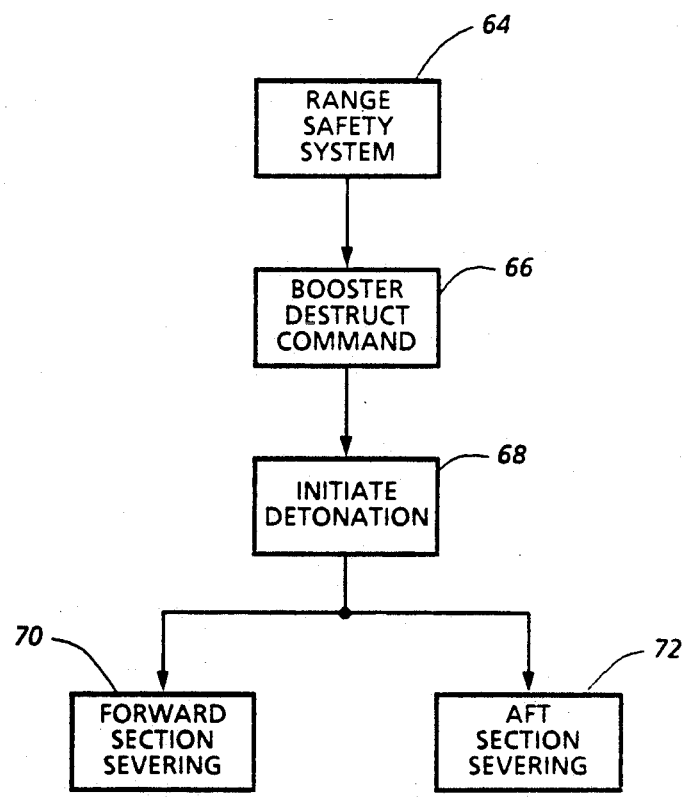
FIG. 8 is a schematic block diagram illustrating the launch aborting booster destruct method associated with the assembly shown in FIGS. 2 and 7, in accordance with the present invention.

As diagramed in FIG. 8, the foregoing destruct action is associated with an otherwise known range safety system 64 from which a booster destruct command 66 is derived. In response to such command, a charge detonation operation is initiated through the cabling and confined detonating fuze 44, as indicated by reference numeral 68 in FIG. 8, to effect the severing of the booster rockets almost simultaneously at the forward and aft locations of charges 30 and 32 as indicated by reference numerals 70 and 72, respectively.

Figure 9:
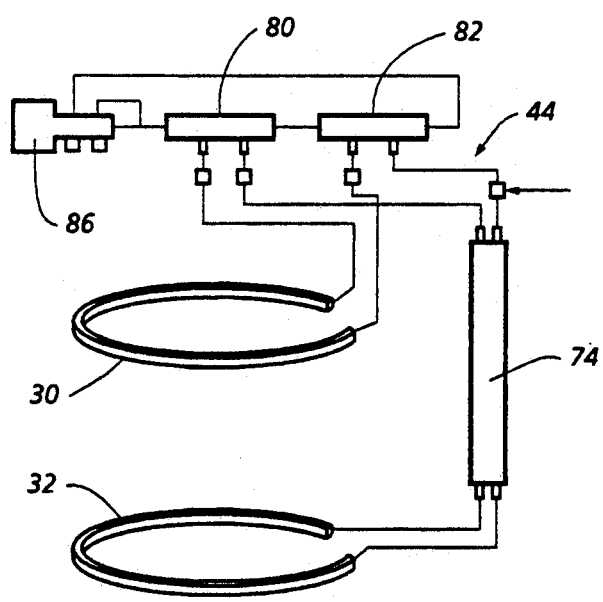
FIG. 9 is a circuit diagram of a detonation initiation system associated with one embodiment of the present invention.

Consistent with the present invention as hereinbefore described, a linear shaped charge could be additionally mounted on each booster 14, extending between the annular charges 30 and 32, in order to clamshell open the separated intermediate section 62 of the booster for further fragmentation without "bend buckling". Any propellant in such intermediate section is thereby broken up by such clamshell opening action. By way of example, FIG. 9 depicts such a linear shaped charge 74 operatively interconnected with the ring charges 30 and 32 through a pair of manifolds 80 and 82. The ring charges 30 and 32 are respectively connected to the manifolds 80 and 82 through the confined detonating fuze and cabling 44 for detonation as aforementioned, under control of safing and arming device 86. The manifolds are also connected to the linear shaped charge 74 for possible delayed detonation after the ring charges are detonated during a destruct sequence.

It will also be appreciated that the invention as described need not be limited to solid fuel rocket boosters since liquid and gas propellant boosters could also be separated from a launched missile with a reduced degree of fragmentation and lower fragmentation velocities pursuant to the present invention.

Numerous other modifications and variations of the present invention are possible in light of the foregoing teachings. It is therefore to be understood that within the scope of the appended claims the invention may be practiced otherwise than as specifically described.

What is claimed is:

1. In a range safety system for a missile carrying a propellant booster, including explosive means responsive to a range safety command for destruct of the booster during launch and wherein said booster has axially forward and aft sections interconnected by an intermediate section, the improvement residing in: means for connecting the booster to the missile only at separate axially spaced attachment locations on the forward and aft section of the booster, mounting means restrictively positioning said explosive means at predetermined locations on the booster and means responsive to detonation of the explosive means at said predetermined locations for severing the intermediate section of the booster from the forward and aft sections, whereby the forward and aft sections of the booster are retained on the missile while the intermediate section is separated therefrom.

2. The combination of claim 1, wherein said explosive means comprises annular shaped charges substantially encircling the at said predetermined locations adjacent to said attachment locations.

3. The combination of claim 1, wherein said propellant booster is a solid fuel rocket having an outer shell on which the explosive means in externally positioned by the mounting means.

4. The combination of claim 3, wherein said explosive means comprises annular shaped charges substantially encircling the booster at said predetermined locations adjacent to said attachment locations.

5. The combination of claim 4, wherein said missile is an external tank of an aerospace vehicle.

6. In combination with a missile having a propellant rocket with forward and aft sections, a range safety system for flight termination during launch of the missile comprising a plurality of shaped charges and means for detonation of the shaped charges, the improvement residing in means for controlling fragmentation of the rocket in response to said detonation of the shaped charges, including: means connecting the rocket to the missile exclusively at spaced attachment locations on the forward and aft sections of the rocket; and mounting means for positioning said shaped charges on the rocket adjacent to said attachment locations to define an intermediate section of the rocket severed by said detonation from the forward and aft sections which remain attached to the missile.

7. The combination of claim 6, wherein said shaped charges respectively encircle the rocket to cause said intermediate section to be separated from the forward and aft sections of the rocket when severed by said detonation of the shaped charges.

* * * * *